United States Patent [19]

Taylor

[11] 4,248,898
[45] Feb. 3, 1981

[54] METHOD OF MAKING YOGURT
[76] Inventor: Frank Taylor, 9415 Central St., LaSalle, Quebec, Canada, H8R 2K4
[21] Appl. No.: 42,873
[22] Filed: May 29, 1979
[30] Foreign Application Priority Data
  May 31, 1978 [CA] Canada .................................. 304515
[51] Int. Cl.³ ............................................... A23C 9/12
[52] U.S. Cl. ...................................... 426/43; 426/583
[58] Field of Search .................... 426/34, 43, 231, 583
[56] References Cited
  U.S. PATENT DOCUMENTS
  3,269,842  8/1966  Mayer et al. ........................... 426/43

Primary Examiner—Raymond N. Jones
Assistant Examiner—Elizabeth J. Curtin

[57] ABSTRACT

A method of making yogurt by mixing a boiling liquid with cold milk in proportions to provide a mixture at a temperature of about 112° to 118° F. adding yogurt culture to the mixture, storing the mixture in an insulated vessel to permit fermentation to the mixture to form a yogurt. An apparatus including a container having a level indicator for cold milk and a second level indicator for a mixture of cold milk and a boiling liquid, one of said indicators indicating a plurality of levels in terms of temperature of the cold milk whereby the resultant mixture will have a temperature of between 112° and 118° F. when filled to the level indicated for the temperature of the cold milk.

4 Claims, 3 Drawing Figures

METHOD OF MAKING YOGURT

FIELD OF THE INVENTION

The present invention relates to making yogurt at home. More particularly the present invention relates to a method and apparatus for making yogurt at home without requiring a thermostatically controlled appliance or means for accurately measuring the yogurt temperature.

PRIOR ART

This invention consists of a device for the making of yogurt at home that is novel, practical and very low in cost. Yogurt is cultured milk achieved by the action of two or more different bacteria, generally streptococcus thermophilus and lactic bacillus. When these are introduced in equal proportions into sterile milk and kept at a certain temperature, they multiply, transforming the milk lactose into lactic acid and thereby coagulating the milk and forming yogurt. Yogurt has long been known as a health food and some Europeans even claim it has life-prolonging capabilities. For this reason and the fact that the product is a nutritious, low-calorie food, with a unique and pleasant taste, it has become a most popular health food in many countries of the world.

Conventional, modern-day yogurt makers are generally electrically-powered and thermostatically controlled, incorporating a low-wattage heating element around the container which replaces heat lost to the ambient air. Temperature control is all important in the making of yogurt as during the fermentation process the ingredients must be kept within a rather rigid range, generally above 100 degrees F. and below 118 degrees F. If allowed to drop lower than this level the fermentation process will cease and if above, the bacteria will be destroyed.

When other more economical and elemental means are employed to make yogurt at home that do not involve expensive electrical appliances, the operation can become time-consuming and somewhat haphazard. Yogurt may be made, for example, by placing jars of the preparation in heated water and endeavouring to keep the water at the prescribed temperature by the addition of hot water from time to time during the incubation period. Other methods involve the use of heat-containment devices, such as moulded insulation containers, that restrict the loss of heat to acceptable levels. All of these methods, however, have two major deficiencies. The first being that the milk to be used is required to be brought to a boil and then allowed to cool to the commencement temperature of say 115 degrees F. before the culture is added, which is time-consuming and requires some cleanup. The second major objection is that unless a good-quality immersible-type thermometer is employed to accurately measure the temperature, the yogurt batch may be easily spoiled.

BRIEF DESCRIPTION OF THE INVENTION

It is the main object of this invention to provide a method and apparatus for preparing yogurt at home without requiring an expensive temperature controlled yogurt maker or an accurate thermometer to establish when the yogurt is at the incubation starting temperature.

Broadly the present invention relates to a method of making yogurt by heating a first aqueous liquid portion to bring same to a boil, mixing said first portion with a portion of milk having a temperature of less than about 90° F. in a container said first and second portions being combined in a ratio to provide a combined yogurt base composition at 112°-118° F., adding a yogurt culture to the base and placing the container in an insulated vessel, thereby prohibiting the temperature of the material in said container from cooling to a temperature below 100° F. in less than 6 hours and maintaining said mixture in said container in said vessel until the yogurt has matured. Preferably the milk will comprise canned evaporated milk.

The present invention also relates to an apparatus for carrying out the method, said apparatus comprising a container, first indicator means indicating the level in said container for a milk portion, second indicator means for indicating combined level of said milk and a boiling liquid portion, one of said indicator means comprising a fixed level and the other of said indicator means providing a plurality of level indicators corresponding to the temperature of said milk to be used.

Further features, objects and advantages will be evident from the following detailed description of the preferred embodiments of the present invention taken in conjunction with the accompanying drawings in which.

Figure 3:
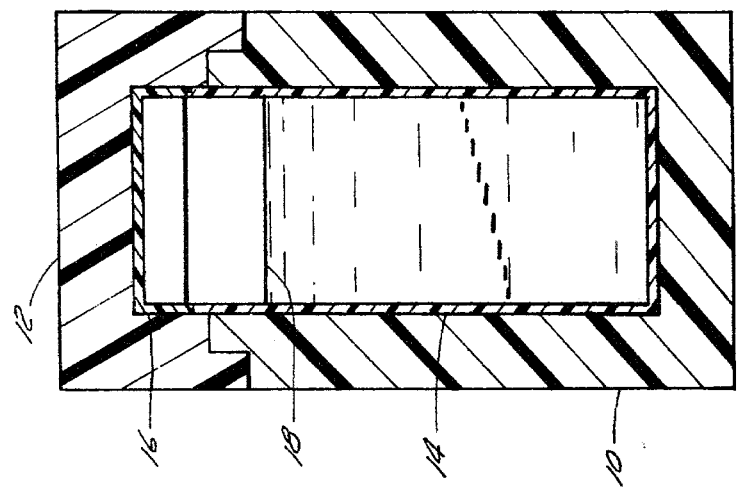
FIG. 3 is a section through the filled vessel of FIG. 1.
Figure 2:
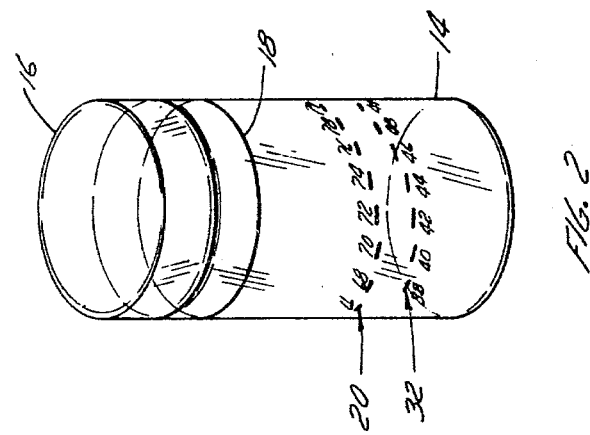
FIG. 2 is an isometric view of a container for mixing the liquid base portions for forming the yogurt.
Figure 1:
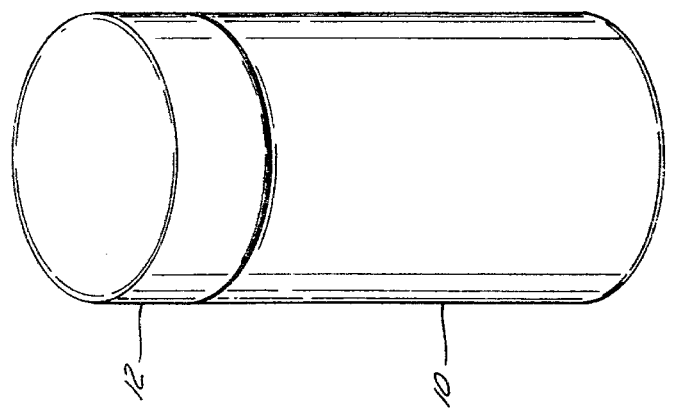
FIG. 1 is an isometric view of a yogurt making vessel of the present invention.

The yogurt maker of the present invention comprises a hollow insulated vessel 10 having an insulated closing lid 12 (FIG. 1) adapted to receive a yogurt container 14 having a lid 16 (FIG. 2).

This vessel is preferably formed of moulded polystyrene foam and should have walls at least 1½ inches thick and a bottom and a top of at least 1 inch thickness when the vessel is made of polystyrene foam of a density of 1.6 to 2 lbs. per cu. ft. This will ensure for a 2 liter container that the heat loss from the yogurt does not exceed 2° F. per hour assuming the vessel is indoors.

The container 14 and lid 16 may be made of any suitable material but preferably is moulded of high-density un-adulterated polyethylene. This container 14 is provided with at least a pair of indicator means 18 and 20. The former indicating the final level of the two liquid base portions being mixed and the latter being graduated on say 2° F. intervals as indicated at 68, 70, 72, 74, 76 etc. to indicate the amount of low temperature liquid base material (milk) to be provided in accordance with the temperature of the low temperature liquid.

If the low temperature liquid is canned evaporated milk maintained at room temperature the graduation of 66°, 68°, 70°, 72°, 74° F., etc. are normally satisfactory. On the other hand, if the low temperature milk is from the refrigerator the graduation would be suitably placed for a low temperature milk of say 38°, 40°, 42°, 44° F. Preferably the container will be provided with three indicator means the third being indicated at 32 and comprised of a plurality of indicators corresponding to the low temperature of milk from the refrigerator.

It will be noted that in each of the above cases a fixed quantity of yogurt will be produced. If desired the cold milk indicator may be fixed and the indicator 18 formed of a plurality of indicies at different levels corresponding to the starting temperature of the cold milk.

It is also possible to provide a separate stirring stick with graduations positioned in the manner described and use same as a level indicator in combination with a predetermined vessel shape to permit mixing the two portions in the quantities necessary to obtain the desired starting temperature.

It is a simple matter to determine the location of the various indicies 18, 20 and 30 since we know the temperature of the hot liquid is 212° F. and we have a good idea of the temperature of the cold milk we then can calculate the proportions of the two portions to arrive at the desired starting temperature from the formula:

$$\frac{(T_1 \times Q_1) + (T_B \times Q_B)}{Q_M} = T_M \quad (1)$$

$$Q_1 + Q_B = Q_M \quad (2)$$

Where
- $T_1$ = Temperature of low temperature milk—°F.
- $Q_1$ = Quantity of low temperature milk—ounces
- $T_B$ = Temperature of boiling portion—212° F.
- $Q_B$ = Quantity of boiling portion—ounces
- $T_M$ = Temperature of the mix—°F.
- $Q_M$ — Quantity of the mix—ounces Generally $T_M$ should be slightly above the starting temperature for the yogurt making, i.e. between 112° and 118° F. so that when the desired quantity of yogurt culture is added the resultant temperature will be at the starting temperature for fermentation, i.e. about 114° F. To obtain a mixture of $Q_M$ = 64 ounces at a temperature of 114° F. requires at a $T_1$ of 40° F. $Q_1$ = 36.5 ounces and $Q_B$ of 27.5 ounces. Similarly with a $T_1$ of 70° F., $Q_1$ must equal 44.2 ounces and $Q_B$ 19.8 ounces.

To carry out the method of the present invention, assuming cold milk at 70° F. is to be used a quantity of milk is poured into the container 14 to the level indicated on indication means 20 for 70° F. Preferably the cold milk will be canned evaporated milk. A portion of aqueous liquid, i.e. either water or milk is brought to a boil on the stove and is poured into the container 14 to fill the container to the level indicated by indicator 18.

The yogurt culture is then added and the lid 16 is applied and the closed container 14 placed into the insulated vessel 10 which is then closed with the lid 12. The yogurt is left for the desired period of time and then the vessel 10 opened and the container 14 removed so that the lid 16 may then be removed for access to the yogurt.

The term aqueous liquid as used herein is intended to include only water and or milk or liquids that would be compatible with making yogurt.

Having described the invention modifications will be apparent to those skilled in the art without departing from the spirit of the invention as defined in the appended claims.

I claim:

1. A method of making yogurt comprising, filling a container to a first pre-set level with milk, boiling an aqueous liquid, adding an amount of said boiling aqueous liquid to said milk to fill said container to a second pre-set level and to form a mixture of said milk and said liquid in a ratio so that said mixture is at a temperature of 112°–118° F., adding a yogurt culture to said mixture, placing said container containing said mixture at a temperature of between 112°–118° F. in an insulated vessel, maintaining said mixture in said container in said insulated vessel until the desired fermentation to form a yogurt is completed, said insulated vessel preventing said mixture from cooling below 100° F. for at least six hours from the time it is placed in said insulated vessel.

2. A method as defined in claim 1 wherein the amount of milk filling said container is correlated with the temperature of said milk so that a fixed quantity of said mixture will be available when said boiling liquid is added regardless of the temperature of said milk.

3. A method as defined in claim 1 wherein said milk is canned evaporated milk.

4. A method as defined in claims 1, 2 or 3 wherein said boiling liquid is water.

* * * * *